(12) United States Patent
Teo et al.

(10) Patent No.: US 8,415,833 B2
(45) Date of Patent: Apr. 9, 2013

(54) WIRELESS ENERGY TRANSFER WITH NEGATIVE INDEX MATERIAL

(75) Inventors: Koon Hoo Teo, Lexington, MA (US); Vishwanath Iyer, Natick, MA (US); William S. Yerazunis, Acton, MA (US); Chunjie Duan, Medfield, MA (US); Da Huang, Durham, NC (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 326 days.

(21) Appl. No.: 12/648,593

(22) Filed: Dec. 29, 2009

(65) Prior Publication Data
US 2011/0156486 A1    Jun. 30, 2011

(51) Int. Cl.
*H01F 27/42* (2006.01)
*H01F 37/00* (2006.01)
*H01F 38/00* (2006.01)

(52) U.S. Cl.
USPC ............................ 307/104; 343/195; 343/219

(58) Field of Classification Search .................... 307/104
See application file for complete search history.

(56) References Cited

U.S. PATENT DOCUMENTS

| | | | |
|---|---|---|---|
| 2007/0222542 A1 | 9/2007 | Joannopoulos | |
| 2008/0278264 A1* | 11/2008 | Karalis et al. | 333/219 |
| 2009/0262766 A1* | 10/2009 | Chen et al. | 372/26 |
| 2010/0109445 A1* | 5/2010 | Kurs et al. | 307/104 |

* cited by examiner

*Primary Examiner* — Rexford Barnie
*Assistant Examiner* — Toan Vu
(74) *Attorney, Agent, or Firm* — Dirk Brinkman; Gene Vinokur

(57) ABSTRACT

Embodiments of the invention disclose a method and a system configured to exchange energy wirelessly, comprising a structure configured to exchange the energy wirelessly via a coupling of evanescent waves, wherein the structure is electromagnetic (EM) and non-radiative, and wherein the structure generates an EM near-field in response to receiving the energy; and a controller configured to tune up the structure such that the near-field is generated according a particular energy distribution pattern.

19 Claims, 6 Drawing Sheets

WIRELESS ENERGY TRANSFER WITH NEGATIVE INDEX MATERIAL

RELATED APPLICATIONS

This application is related to (MERL-2218) U.S. patent application Ser. No. 12/630,498 entitled "Wireless Energy Transfer with Negative Index Material," filed by Koon Hoo Teo et al. on Dec. 3, 2009, (MERL-2221) U.S. patent application Ser. No. 12/630,543 entitled "Wireless Energy Transfer with Negative Index Material," filed by Koon Hoo Teo et al. on Dec. 3, 2009, (MERL-2222) U.S. patent application Ser. No. 12/630,669 entitled "Wireless Energy Transfer with Negative Material," filed by Koon Hoo Teo et al. on Dec. 3, 2009, (MERL-2223) U.S. patent application Ser. No. 12/630, 710 entitled "Wireless Energy Transfer with Negative Index Material" filed by Koon Hoo Teo et al. on Dec. 3, 2009, all incorporated herein by reference.

FIELD OF THE INVENTION

The present invention relates to transferring energy, and more particularly, to transferring energy wirelessly.

BACKGROUND OF THE INVENTION

Wireless Energy Transfer

Inductive coupling is used in a number of wireless energy transfer applications, such as charging a cordless electric toothbrush or hybrid vehicle batteries. In coupled inductors, such as transformers, a source, e.g., primary coil, generates energy as an electromagnetic field, and a sink, e.g., a secondary coil, subtends that field such that the energy passing through the sink is optimized, e.g., is as similar as possible to the energy of the source. To optimize the energy, a distance between the source and the sink should be as small as possible, because over greater distances the induction method is highly ineffective.

Resonant Coupling System

In resonant coupling, two resonant electromagnetic objects, i.e., the source and the sink, interact with each other under resonance conditions. The resonant coupling transfers energy from the source to the sink over a mid-range distance, e.g., a fraction of the resonant frequency wavelength.

FIG. 1 shows a conventional resonant coupling system 100 for transferring energy from a resonant source 110 to a resonant sink 120. The general principle of operation of the system 100 is similar to inductive coupling. A driver 140 inputs the energy into the resonant source to form an oscillating electromagnetic field 115. The excited electromagnetic field attenuates at a rate with respect to the excitation signal frequency at driver or self resonant frequency of source and sink for a resonant system. However, if the resonant sink absorbs more energy than is lost during each cycle, then most of the energy is transferred to the sink. Operating the resonant source and the resonant sink at the same resonant frequency ensures that the resonant sink has low impedance at that frequency, and that the energy is optimally absorbed. Example of the resonant coupling system is disclosed in U.S. Patent Applications 2008/0278264 and 2007/0222542, incorporated herein by reference.

The energy is transferred, over a distance D, between resonant objects, e.g., the resonant source having a size $L_1$ and the resonant sink having a size $L_2$. The driver connects a power provider to the source, and the resonant sink is connected to a power consuming device, e.g., a resistive load 150. Energy is supplied by the driver to the resonant source, transferred wirelessly and non-radiatively from the resonant source to the resonant sink, and consumed by the load. The wireless non-radiative energy transfer is performed using the field 115, e.g., the electromagnetic field or an acoustic field of the resonant system. For simplicity of this specification, the field 115 is an electromagnetic field. During the coupling of the resonant objects, evanescent waves 130 are propagated between the resonant source and the resonant sink.

Coupling Enhancement

According to coupled-mode theory, the strength of the coupling is represented by a coupling coefficient k. The coupling enhancement is denoted by an increase of an absolute value of the coupling coefficient k. Based on the coupling mode theory, the resonant frequency of the resonant coupling system is partitioned into multiple frequencies. For example, in two objects resonance compiling systems, two resonant frequencies can be observed, named even and odd mode frequencies, due to the coupling effect. The coupling coefficient of two objects resonant system formed by two exactly same resonant structures is calculated by partitioning of the even and odd modes according to $$\kappa = \pi |f_{even} - f_{odd}| \qquad (1)$$

It is a challenge to enhance the coupling. For example, to optimize the coupling, resonant objects with a high quality factor are selected.

Accordingly, it is desired to optimize wireless energy transfer between the source and the sink.

SUMMARY OF THE INVENTION

Embodiments of the invention are based on a realization that tuning a dominant frequency of a source or a sink of a wireless energy transfer system enables at least four different electromagnetic (EM) energy distribution patterns having maximum intensities in different zones. This realization allows transferring energy in different direction with optimized efficiency.

One embodiment of the invention provides a system configured to exchange energy wirelessly, comprising a structure configured to exchange the energy wirelessly via a coupling of evanescent waves, wherein the structure is electromagnetic (EM) and non-radiative, and wherein the structure generates an EM near-field in response to receiving the energy; and a controller configured to tune the structure such that the near-field is generated according a particular energy distribution pattern.

Another embodiment of the invention provides a method for exchanging energy wirelessly via a coupling of near-fields, comprising steps of providing a first structure configured to exchange energy wirelessly with a second structure via the coupling of near-fields of the first structure and the second structure, wherein the first and the second structures are electromagnetic (EM) and non-radiative, and wherein the first and the second structures generate EM near-fields in response to receiving the energy; determining an orientation between the first structure and the second structure; tuning a dominant frequency of the first structure such that the near-field of the first structure is generated according a particular energy distribution pattern optimal for the orientation; and exchanging energy wirelessly.

BRIEF DESCRIPTION OF THE DRAWINGS

FIGS. 2B-5 are schematics of different embodiments of the invention.

DETAILED DESCRIPTION OF THE PREFERRED EMBODIMENTS

Embodiments of the invention are based on a realization that tuning a dominant frequency of a source or a sink of a wireless energy transfer system enables the generation of at least four different electromagnetic (EM) energy distribution patterns with maximum intensities in different zones. This realization allows transferring energy in different direction with optimized efficiency.

Figure 1:
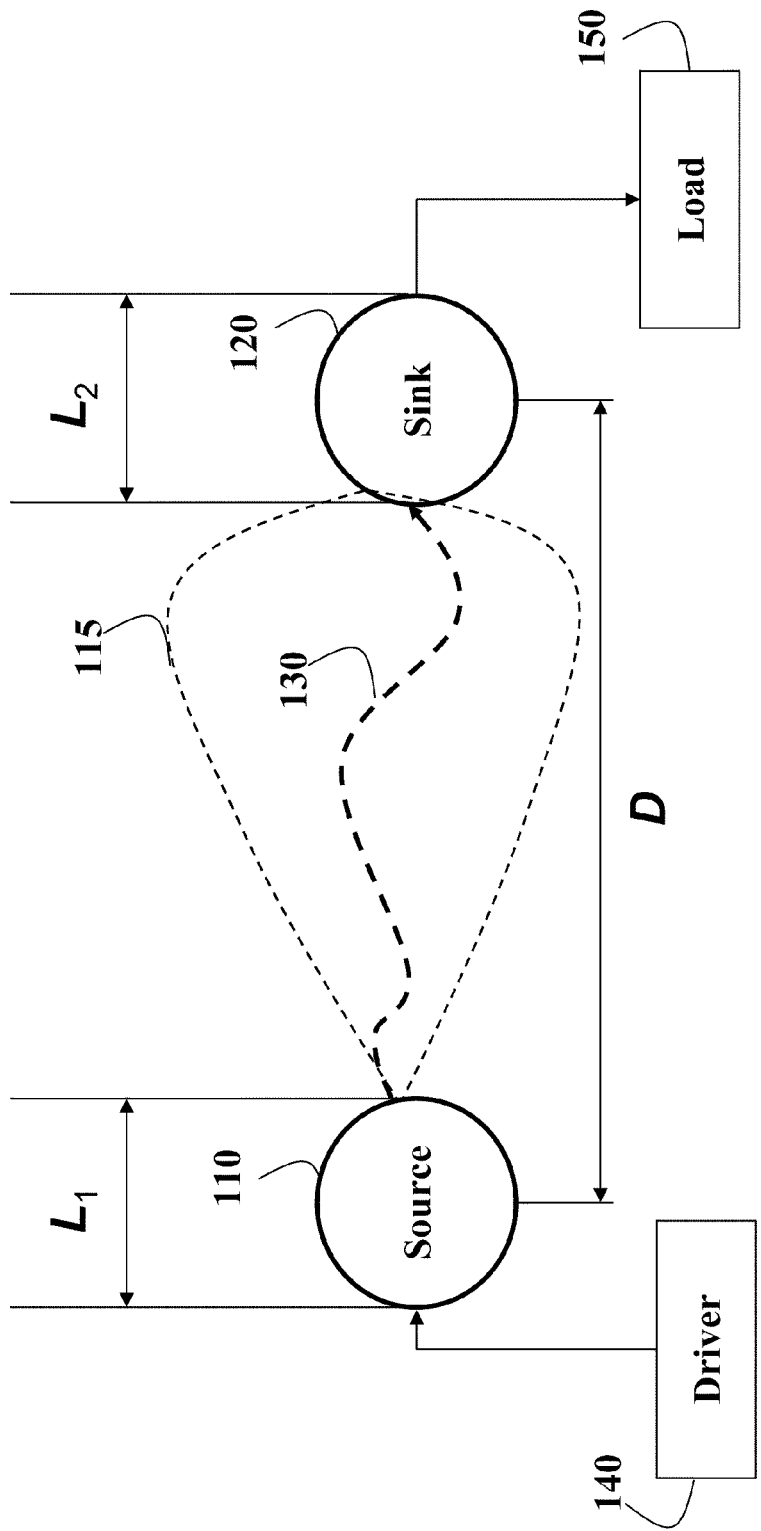
FIG. 1 is a block diagram of a conventional resonant coupling system.
Figure 2A:
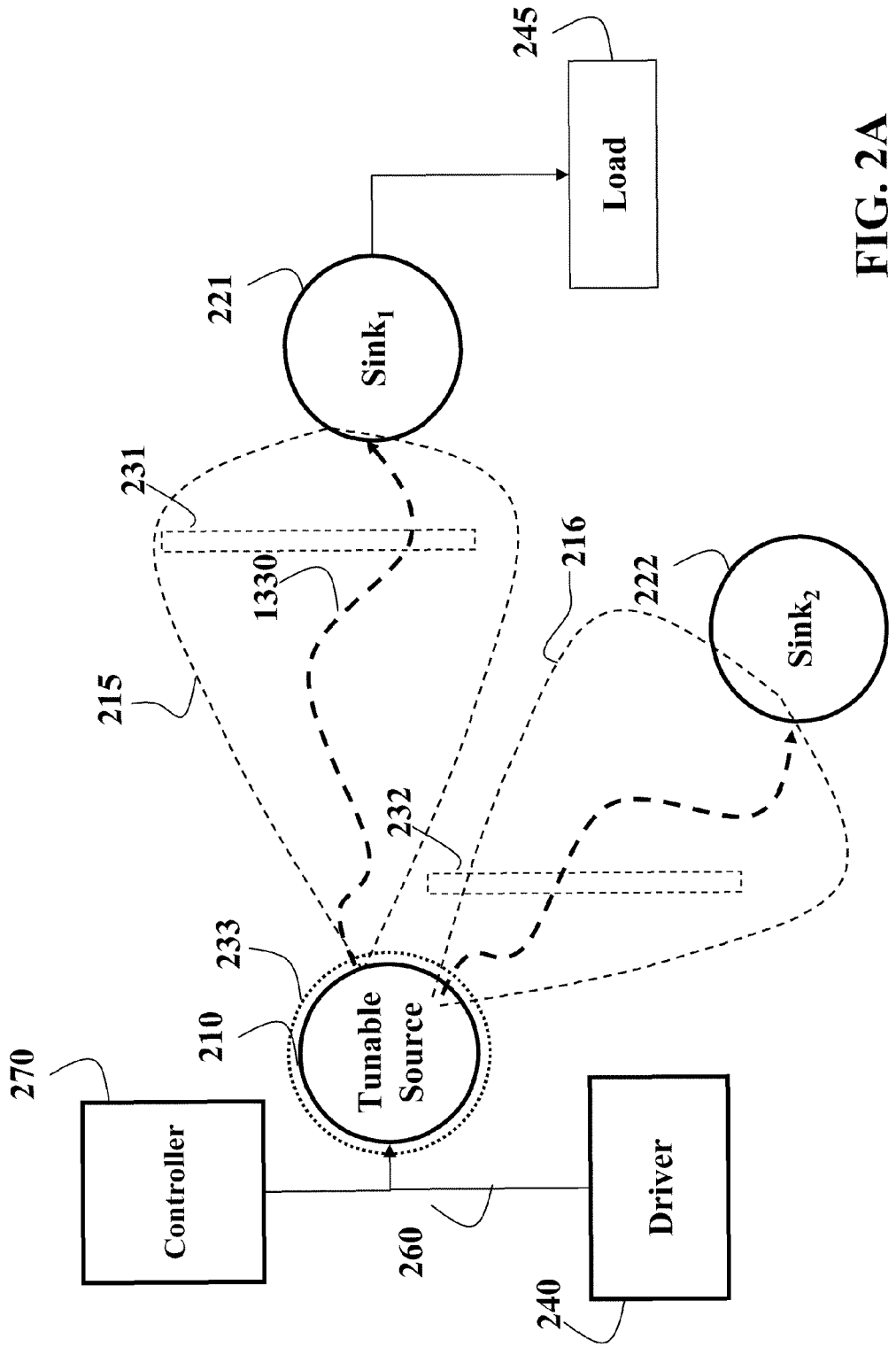
FIG. 2A is a schematic of a system suitable to transfer or receive energy wirelessly according to an embodiment of the invention.

FIG. 2A shows an embodiment of our invention configured to optimized wireless energy transfer form a tunable source 210 to multiple sinks. When the driver 240 supplies the energy 260 to the source 210, the source generates an EM field 215. Typically, the near-field 215 is generated according to a particular energy distribution pattern. The pattern, as described below, has different zones, such as optimum zones, wherein near-field intensities are optimal, i.e., maximum, and blind zones, wherein the near-field intensities are minimized.

In some applications, it is advantageous to transfer the energy to more than one sink, e.g., to the $sink_1$ 221 and to the $sink_2$ 222. However, if the $sink_1$ occupies the optimal zone of the energy distribution pattern of the source, the $sink_2$ can be located in the blind zone of the pattern. Therefore, a controller 270 tunes the dominant frequency of the source 210 to change the energy distribution pattern 215 to another energy distribution pattern 216, wherein the optimal zone of the pattern 216 replaces the blind zone of the pattern 215. In one embodiment, the pattern 215 is either even or odd butterfly pattern, and the pattern 216 is either even or odd crossing pattern.

An orientation between the source and the sink is used to determine a particular optimal pattern for wireless energy transfer between the source and the sink. Accordingly, the embodiments facilitate reusing one source to transfer energy optimally to multiple directions corresponding to locations of different sinks. Similarly, one sink can receive the energy from multiple sources, i.e., from different directions.

In one embodiment, the tuning of the dominant frequency is achieved by an oscillator, e.g., a voltage or a digital controlled oscillator. A controller 270 monitors a control signal, e.g., voltage or digital signal, of the oscillator to achieve the desired resonant frequency for the system. Examples of such oscillators are oscillators manufactured by Digi-key, and Narda companies. Another example is the Crysteck corporation oscillator (model no: CVCO55CL-0060-0110), which provides frequency tuning range from 60 MHz to 110 MHz with tuning voltage changing from 0.5V to 9.5V.

Figure 2B:
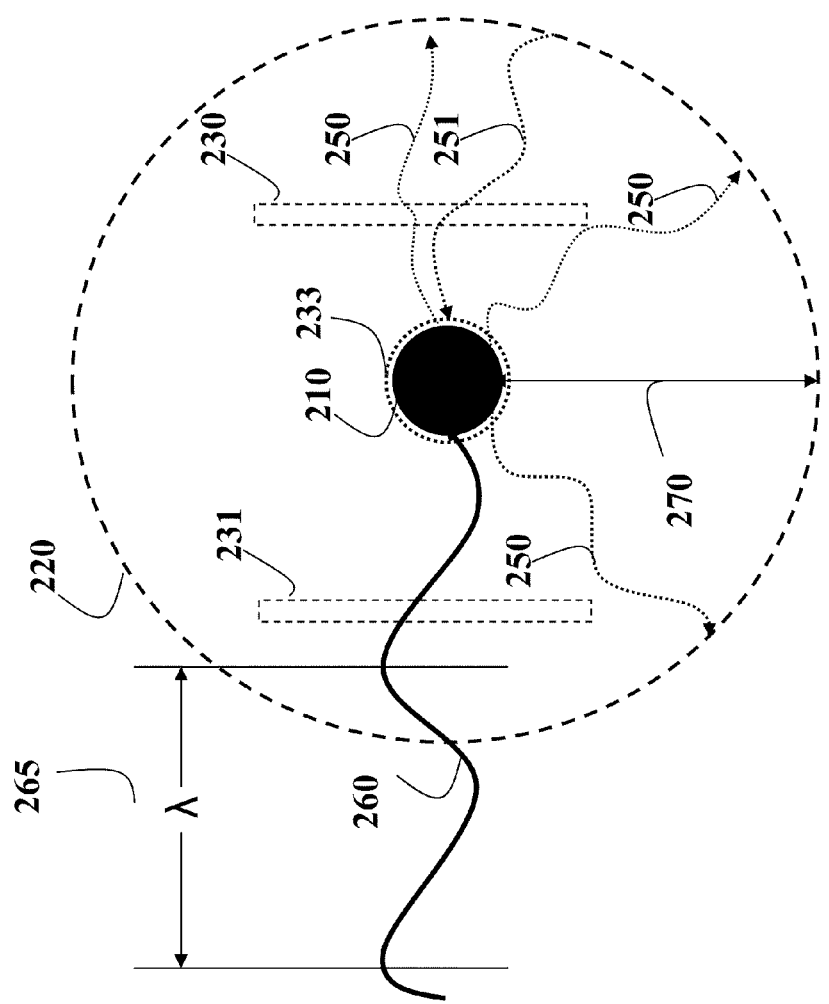

FIG. 2B shows a system 200 according an embodiment of the invention. The system is configured to exchange, e.g., transmit or receive, energy wirelessly. The system includes the structure 210 configured to generate an electromagnetic field 220 when the energy is received by the structure and exchange the energy wirelessly via a coupling of evanescent waves.

In one embodiment, the energy 260 is supplied by the driver 240. In this embodiment, the structure 210 serves as a source of the wireless energy transfer system. In an alternative embodiment, the energy 260 is supplied wirelessly from the source (not shown). In that embodiment, the structure 210 serves as a sink of the wireless energy transfer system.

The system 200 optionally includes a negative index material (NIM) 231-233 arranged within the near-field 220. The NIM is a material with negative permittivity and negative permeability properties. Several unusual phenomena are known for this material, e.g., evanescent wave amplification, surface plasmoni-like behavior and negative refraction. Embodiments of the invention appreciated and utilized the unusual ability of NIM to amplify evanescent waves, which optimizes wireless energy transfer.

In one embodiment, the NIM 233 substantially encloses the EM structure 210. Enclosing the EM structure with NIM is advantageous for increasing the coupling of evanescent waves between the source and the sink. In variations of this embodiment, the NIM can enclose the source, the sink or both. In one embodiment, there is a gap between the NIM and the EM structure. In another embodiment, multiple layers of the NIM are used.

The shape and dimensions of the near-field, i.e., the energy distribution pattern, depends on a frequency of the external energy 260, and on a resonant frequency of the EM structure 210, determined in part by a shape of the EM structure, e.g., circular, helical, cylindrical shape, and parameters of a material of the EM structure such as conductivity, relative permittivity, and relative permeability.

Usually, a range 270 of the near-field is in an order of a dominant wavelength of the system. In non resonant systems, the dominant wavelength is determined by a frequency of the external energy 260, i.e., the wavelength $\lambda$ 265. In resonant systems, the dominant wavelength is determined by a resonant frequency of the EM structure. In general, the dominant wavelength is determined by the frequency of the wirelessly exchanged energy.

The resonance is characterized by a quality factor, i.e., a dimensionless ratio of stored energy to dissipated energy. Because the objective of the system 200 is to transfer or to receive the energy wirelessly, the frequency of the driver or the resonant frequency is selected such as to increase the dimensions of the near-field region. In some embodiments, the frequency of the energy 260 and/or the resonant frequency is in diapason from MHz to GHz. In other embodiments, aforementioned frequencies are in the light domain.

Evanescent Wave

An evanescent wave is a near-field standing wave with an intensity that exhibits exponential decay with distance from a boundary at which the wave is formed. The evanescent waves 250 are formed at the boundary between the structure 210 and other "media" with different properties in respect of wave motion, e.g., air. The evanescent waves are formed when the external energy is received by the EM structure and are most intense within one-third of a wavelength of the near field from the surface of the EM structure 210.

Whispering Gallery Mode

Whispering gallery mode (WGM) is the energy distribution pattern in which the evanescent waves are internally reflected or focused by the surface of the EM structure. Due to minimal reflection and radiation losses, the WGM pattern reaches unusually high quality factors, and thus, WGM is useful for wireless energy transfer.

Figure 3:
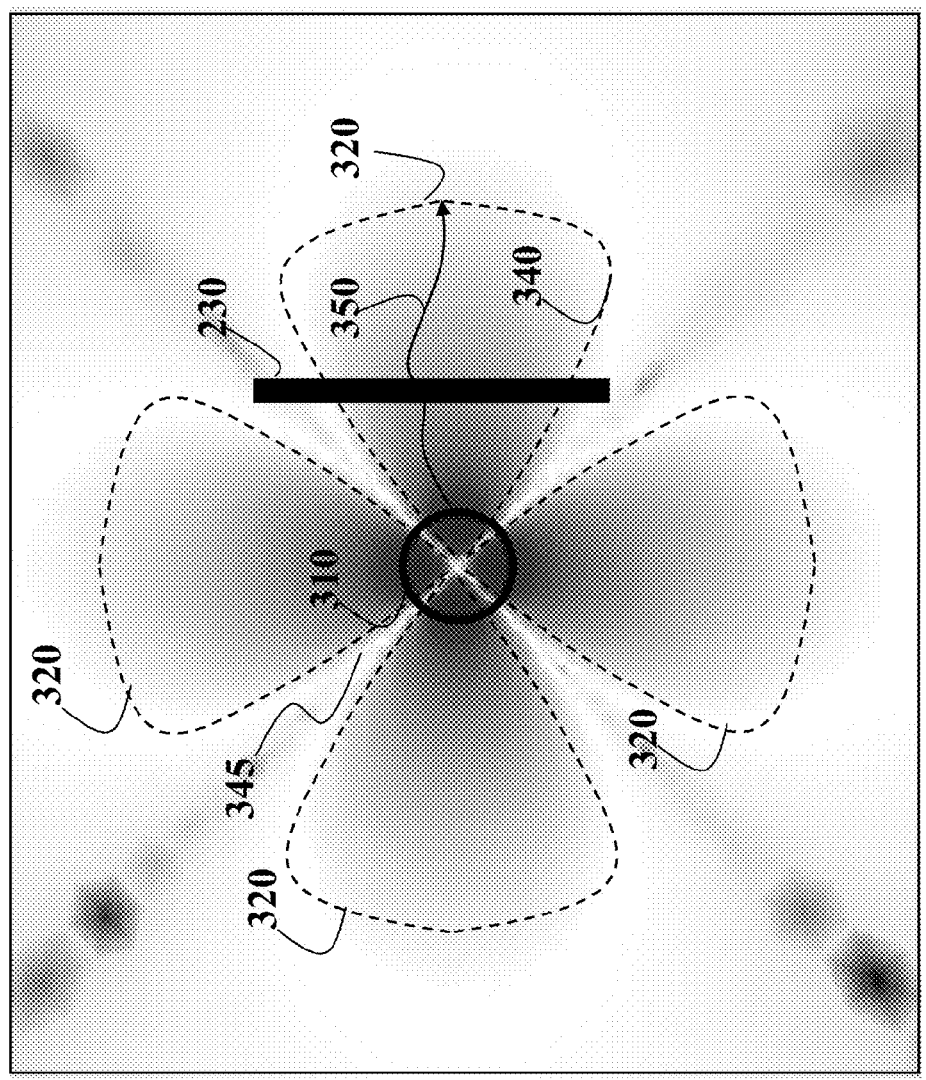
Figure 3:
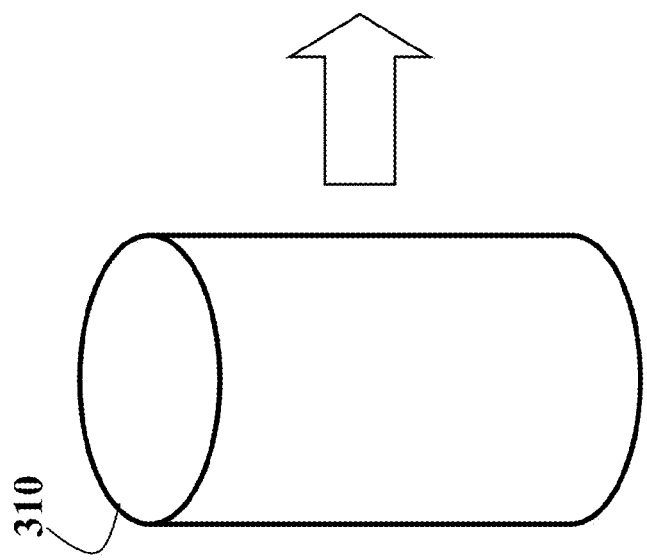

FIG. 3 shows an example of the EM structure, i.e., a cylinder 310. Depending on material, geometry and dimensions of the cylinder 310, as well as the dominant frequency, the EM near-field intensities and energy density are maximized at the surface of the disk according to a WGM pattern 320.

The WGM pattern is not necessarily symmetric to the shape of the EM structure. The WGM pattern typically has blind zones 345, in which the intensity of the EM near-field is minimized, and optimal zones 340, in which the intensity of the EM near-field is maximized. Some embodiments of the invention place the NIM 230 in the optimal zones 340 to extend a range of the evanescent waves 350.

Even and Odd Modes

Figure 4:
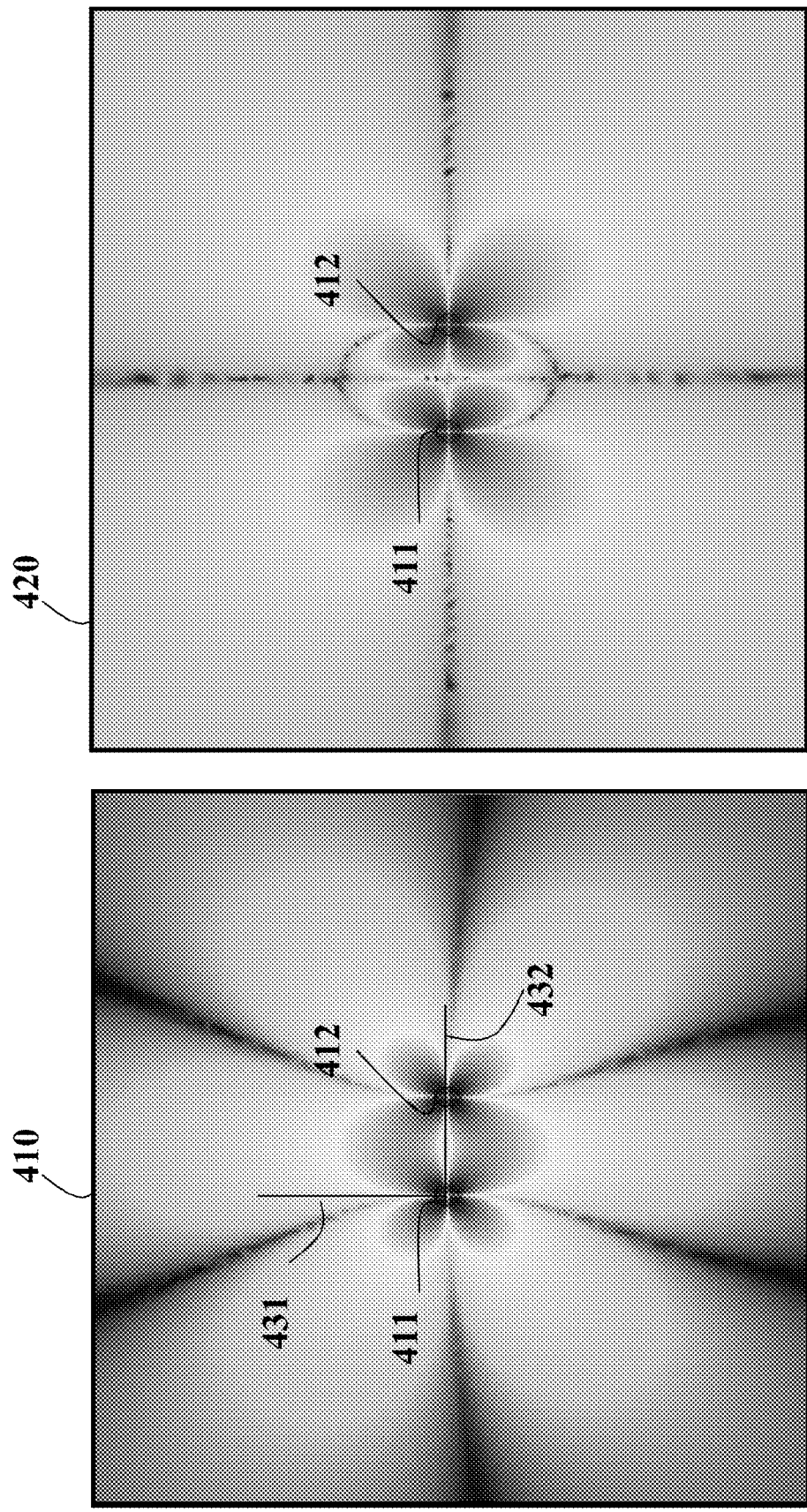

FIG. 4 shows a butterfly energy distribution pattern. When two EM structures 411 and 412 are coupled to each other forming a coupled system, the dominant frequency of the coupled system is represented by even and odd frequencies. The near-field distribution at even and odd frequencies is defined as even mode coupled system 410 and an odd mode coupled system 420. Typical characteristic of the even and the odd modes of the coupled system of two EM structures is that if the EM field is in phase in the even mode then the EM field is out of phase in the odd mode.

Butterfly Pair

The even and odd mode coupled systems generate an odd and even mode distribution patterns of the near-field intensities defined as a butterfly pair. The EM near-field intensity distribution of the butterfly pair reaches minimum in two lines 431 and 432 oriented at 0 degree and 90 degree to the center of each EM structure, i.e., blind zones of the butterfly pair. However, it is often desired to change the intensity distribution and eliminate and/or change the positions and/or orientations of the blind zones.

Crossing Pair

Figure 5:
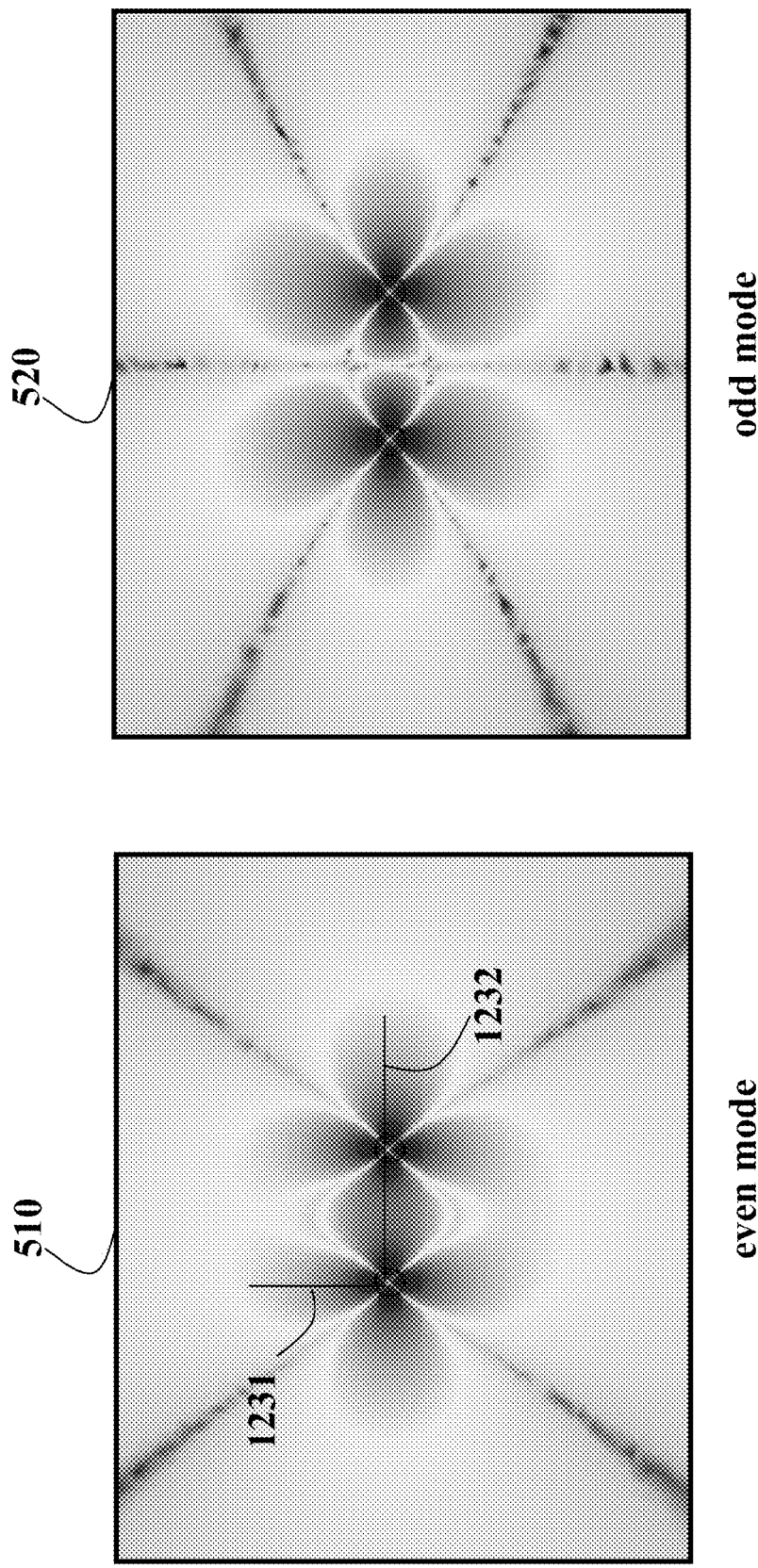

FIG. 5 shows distribution patterns of the near-field intensities according embodiments of the invention define as a crossing pair 500. The crossing pair distribution pattern has optimal zones 531 and 532 oriented at 0 degree and 90 degree to the center of each EM structure, i.e., the optimal zones of the crossing pair pattern corresponds to the blind zones of the butterfly pair pattern. Therefore, one important characteristic of the butterfly pair and the crossing pair patterns is that their respective blind zones are not overlapping, and thus eliminates the blind zones when both kinds of patterns are utilized. Butterfly and crossing patterns have system quality factors and coupling coefficient of the same order of magnitude.

EFFECT OF THE INVENTION

Embodiments of the invention tune the dominant frequency of the source to generate at least four different energy distribution patterns. Those patterns include the butterfly pair pattern and the crossing pair pattern. The orientation between the source and the sink is used to determine a particular pattern optimal for wireless energy transfer between the source and the sink. Accordingly, the embodiments facilitate reusing one source to transfer energy optimally to multiple directions corresponding to locations of different sinks. Similarly, one sink can receive the energy from multiple sources, i.e., from different directions.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A system configured to exchange energy wirelessly, comprising:
a structure configured to exchange the energy wirelessly via a coupling of evanescent waves, wherein the structure is electromagnetic (EM) and non-radiative, and wherein the structure generates an EM field in response to receiving the energy; and
a controller configured to tune a dominant frequency of the structure such that the near-field is generated according a particular energy distribution pattern, the particular energy distribution pattern is determined based on an orientation between a source and a sink.

2. The system of claim 1, wherein the structure is a source configured to transfer the energy to a sink, further comprising:
a driver configured to supply the energy to the structure.

3. The system of claim 1, wherein the structure is a sink configured to receive the energy wirelessly from a source, further comprising:
a load configured to receive the energy from the structure.

4. The system of claim 1, further comprising:
a negative index material (NIM) arranged within the EM field such that the coupling is enhanced.

5. The system of claim 1, wherein the structure is a resonant structure.

6. The system of claim 1, wherein the NIM is arranged optimally based on a desired direction of the energy transfer.

7. The system of claim 1, wherein the NIM is arranged such as to substantially enclose the structure.

8. The system of claim 1, wherein the particular energy distribution pattern is selected from a group of patterns that include an even butterfly pattern, an odd butterfly pattern, even crossing pattern, and an odd crossing pattern.

9. The system of claim 1, wherein the NIM has a negative permittivity property and a negative permeability property.

10. A method for exchanging energy wirelessly via a coupling of near-fields, comprising steps of:
providing a first structure configured to exchange an energy wirelessly with a second structure via the coupling of near-fields of the first structure and the second structure, wherein the first and the second structures are electromagnetic (EM) and non-radiative, and wherein the first and the second structures generate EM near-fields in response to receiving the energy;
determining an orientation between the first structure and the second structure;
tuning a dominant frequency of the first structure such that the near-field of the first structure is generated according a particular energy distribution pattern optimal for the orientation; and
exchanging energy wirelessly.

11. The method of claim 10, further comprising:
increasing the coupling with a negative index material (NIM) arranged within at least one EM near-field.

12. The method of claim 10, wherein the first structure is a resonant structure.

13. The method of claim 11, further comprising:
arranging the NIM is based on the orientation between the first structure and the second structure.

14. The method of claim 11, further comprising:
substantially enclosing the first structure with the NIM.

15. The method of claim 10, wherein the particular energy distribution pattern is selected from a group of patterns that includes an even butterfly pattern, an odd butterfly pattern, even crossing pattern, and an odd crossing pattern.

16. A system for exchanging energy wirelessly via a coupling of near-fields, comprising:
a first structure configured to exchange an energy wirelessly with a second structure via the coupling of near-fields of the first structure and the second structure, wherein the first and the second structures are electromagnetic (EM) and non-radiative, and wherein the first and the second structures generate EM near-fields in response to receiving the energy;

means for determining an orientation between the first structure and the second structure; and means for tuning a dominant frequency of the first structure such that the near-field of the first structure is generated according a particular energy distribution pattern optimal for the orientation.

17. The system of claim 16, wherein the particular energy distribution pattern is selected from a group of patterns that includes an even butterfly pattern, an odd butterfly pattern, even crossing pattern, and an odd crossing pattern.

18. The system of claim 16, wherein the particular energy distribution pattern is selected such as to optimize the exchange of the energy.

19. The system of claim 16, further comprising:

a negative index material (NIM) arranged within the EM near-field such that the coupling is enhanced.

* * * * *

UNITED STATES PATENT AND TRADEMARK OFFICE
CERTIFICATE OF CORRECTION

PATENT NO.       : 8,415,833 B2                           Page 1 of 1
APPLICATION NO.  : 12/648593
DATED            : April 9, 2013
INVENTOR(S)      : Koon Hoo Teo et al.

It is certified that error appears in the above-identified patent and that said Letters Patent is hereby corrected as shown below:

On the Title Page, Item (54) and in the Specification, column 1, line 1-2, in the title, add --System and Method for-- and delete the text "with negative index material"

Title should appear as:

System and Method for Wireless Energy Transfer

Signed and Sealed this
Twenty-fifth Day of November, 2014

Michelle K. Lee
*Deputy Director of the United States Patent and Trademark Office*